D. W. PERIN.
REDUCTION GEARING FOR MOTOR VEHICLES.
APPLICATION FILED FEB. 16, 1920.

1,366,325.

Patented Jan. 18, 1921.

Inventor:
Donald W. Perin
by Roberts, Roberts & Cushman
Att'ys.

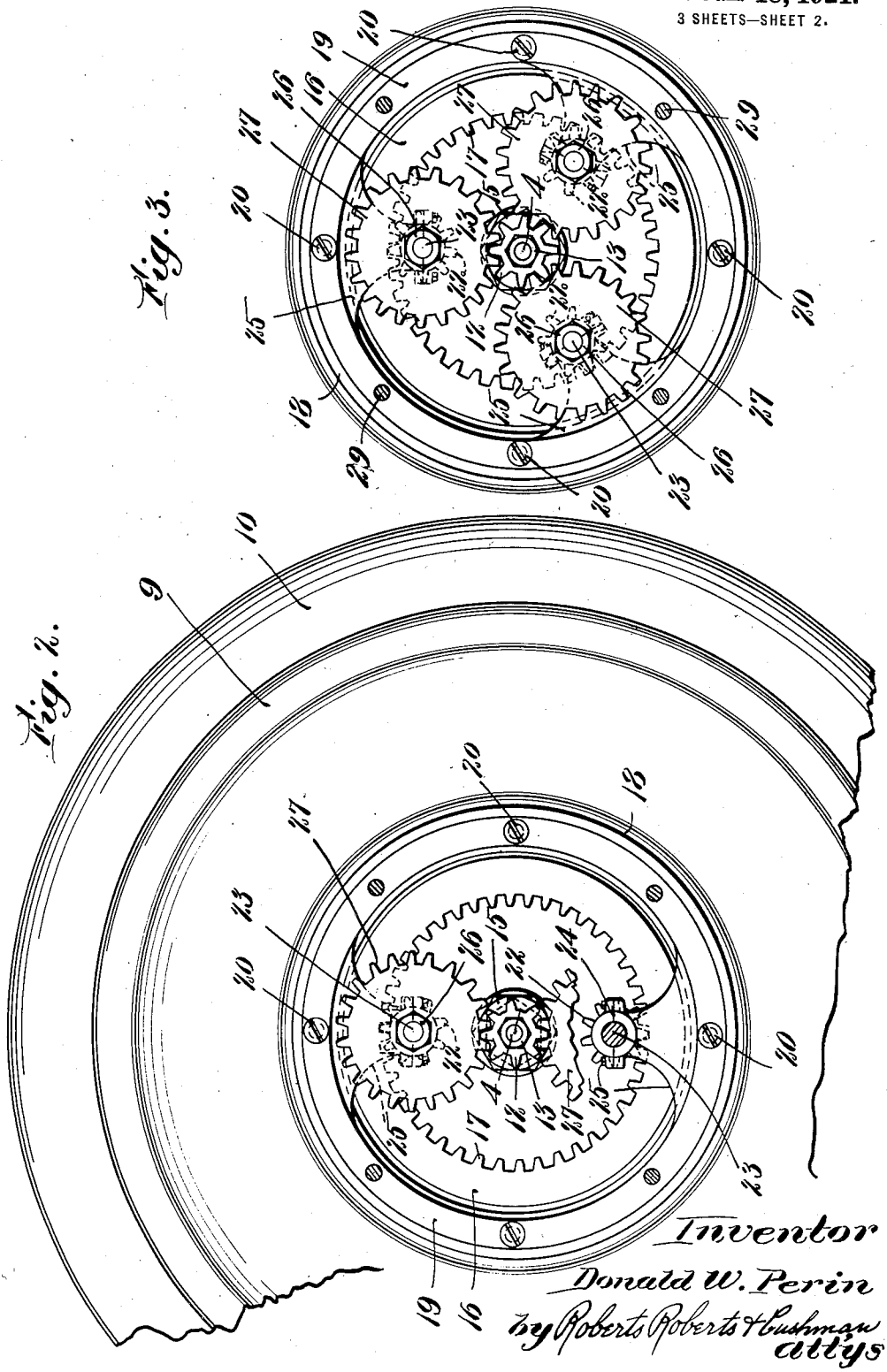

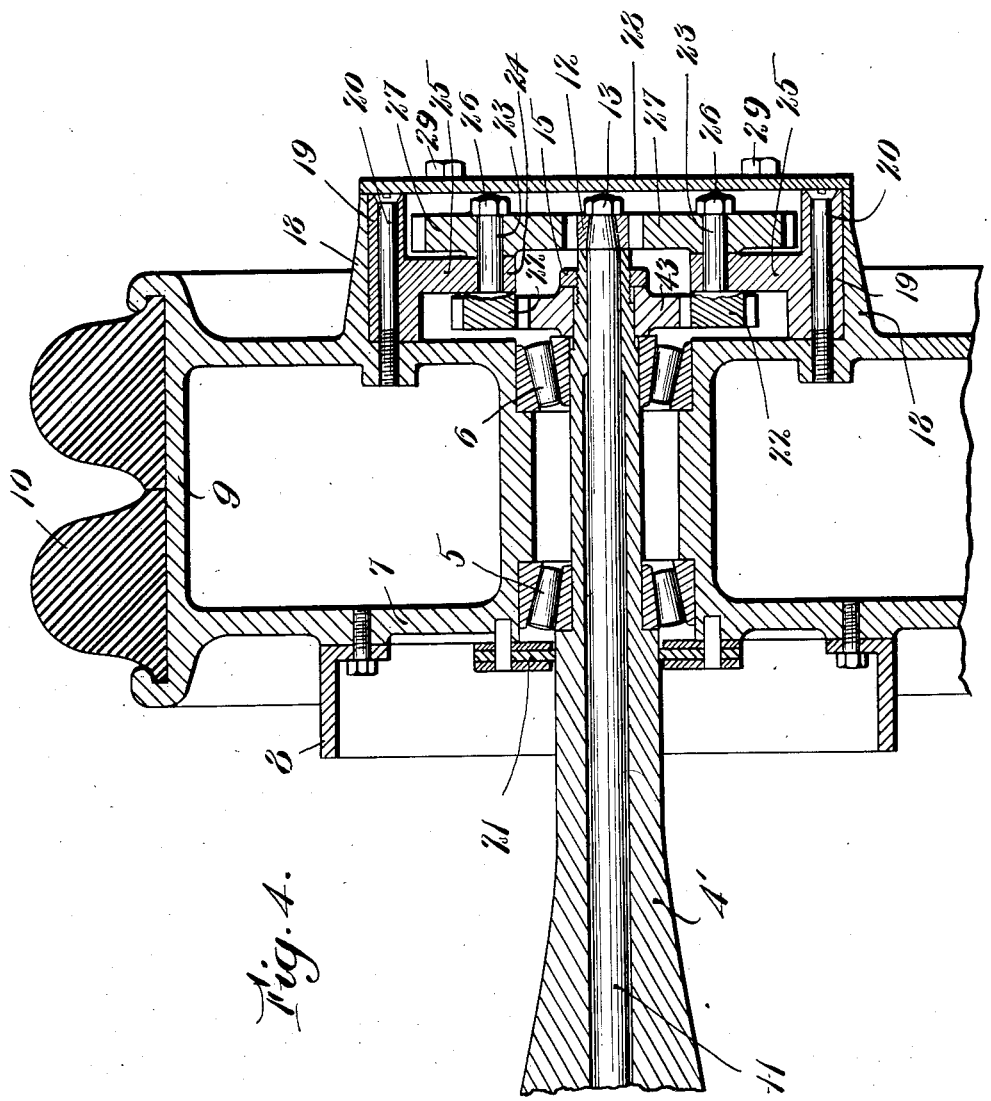

UNITED STATES PATENT OFFICE.

DONALD W. PERIN, OF BROOKLINE, MASSACHUSETTS, ASSIGNOR TO PERIN AUTOMOTIVE ENGINEERING CO., INC., OF BOSTON, MASSACHUSETTS, A CORPORATION OF MASSACHUSETTS.

REDUCTION-GEARING FOR MOTOR-VEHICLES.

1,366,325.   Specification of Letters Patent.   Patented Jan. 18, 1921.

Application filed February 16, 1920. Serial No. 359,167.

*To all whom it may concern:*

Be it known that I, DONALD W. PERIN, citizen of the United States of America, and resident of Brookline, in the county of Norfolk and State of Massachusetts, have invented new and useful Improvements in Improved Reduction-Gearing for Motor-Vehicles, of which the following is a specification.

This invention relates to improvements in driving gear mechanism for automobiles, and more particularly to a combined reduction and driving gear adapted to be mounted upon the wheel to be driven.

Driving gears heretofore in use have, in general, been located within the wheel or the axle housing so as to be comparatively inaccessible. If located within the axle housing or between the wheels, reaching the gears for the purpose of cleaning, lubrication, or repairs requires a considerable dismantling of the rear structure. If located inside the wheel a weakening of the wheel structure is involved since it must be divided at the axle and be without cross support for considerable distance therefrom. Reaching such a structure also involves dismantling much of the wheel structure.

It is an object of my invention to provide an improved reducing and driving gear which is efficient, simple and compact, which may be located upon the outer side of the drive wheels and thus be readily accessible, and which will involve no weakening of the wheel structure. It is also an object to provide such a gear which may be entirely removed from a wheel without removing the wheel from its bearing. It is an additional object to provide a gear which may be located in an oil tight closure and adapted to run in a bath of lubricant. It is a further object to provide a gear in which the gear reduction is independent of the diameter of the wheel and in which the gear ratio may be readily varied without other change in structure than the substitution of gear wheels of different size.

I accomplish these several objects by locating my combined reducing and driving gear in a housing located upon the outer face of the vehicle wheel and preferably attached thereto. In the preferred embodiment the casing is integral with the wheel and all joints can therefore be readily made oil tight. This also results in simplification of the housing structure with consequent economy of manufacture.

In its broadest aspect my gear consists of a driving epicyclic train and a driven train which may be hypocyclic or epicyclic.

In its preferred form my gear consists of a driving epicyclic train and a driven hypocyclic train. In a specific embodiment which will be more fully described hereafter, the driving pinion constitutes the base member of the epicyclic train and the driven member, which is attached to the wheel, carries shafts with which the generating gears of both trains rotate. The base member of the hypocyclic train is fixed to the vehicle structure.

In order to prevent bending stresses upon the drive shaft with consequent binding, the driving pinion may be designed to float between the gears with which it meshes.

I have illustrated certain preferred embodiments of my invention in the accompanying drawings in which;

Fig. 2 is a view on line 2—2 of Fig. 1, partly broken away;

Fig. 3 is a side view of a gear illustrating a modified form of the device; and

Fig. 4 is a view similar to Fig. 1 but of a modified form.

Figure 1:
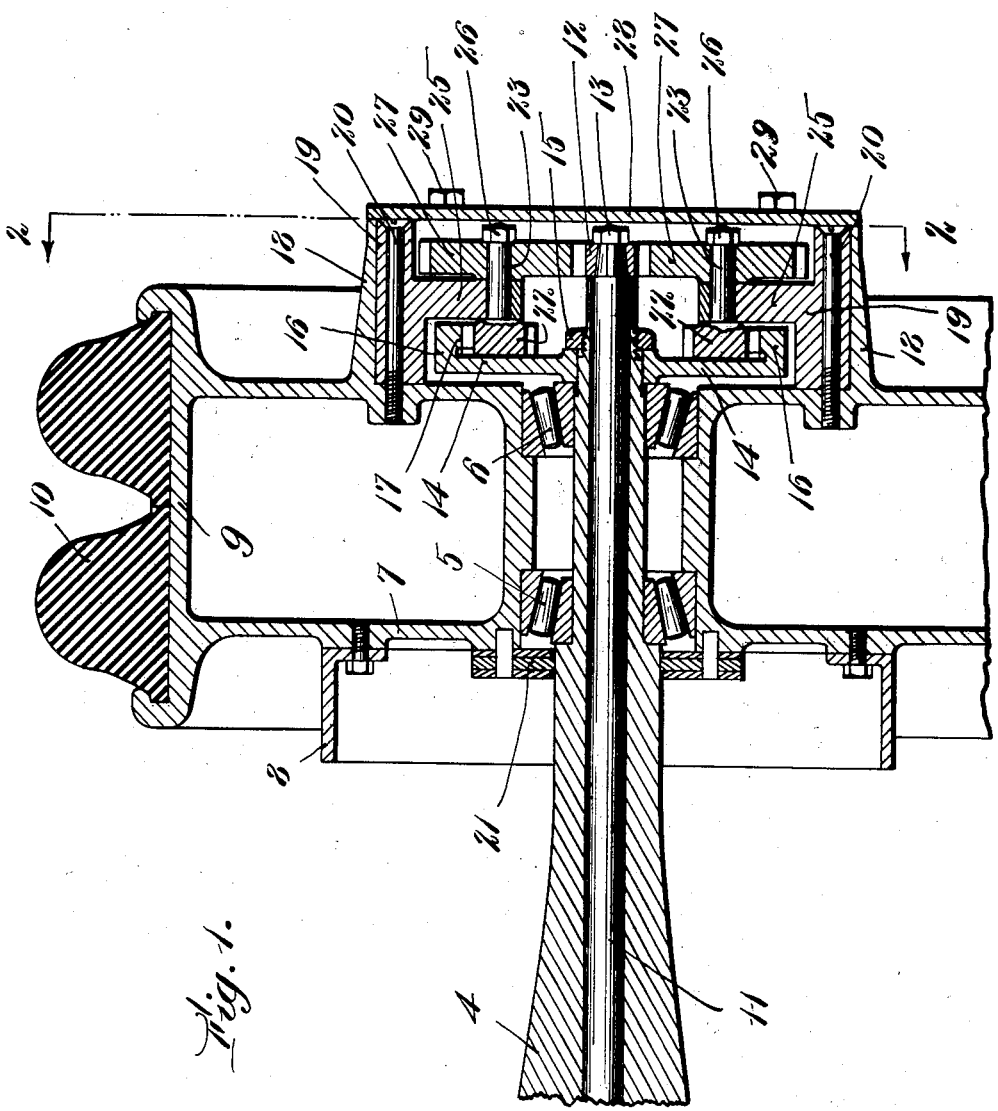
Figure 1 is a cross section of my gear attached to the wheel, the wheel being partly broken away.

Shown in Fig. 1, is a wheel and axle structure much of which is standard in form. This standard structure includes the axle housing 4, the inner roller bearing 5, the outer roller bearing 6, the wheel 7, brake drum 8, dust cover 21, felly 9 and tires 10.

Passing through the axle housing is the driving axle 11 which has the pinion 12 keyed to its outer end and held in place by the nut 13. Keyed to the end of the axle housing is the disk member 14 which is held in place by the nut 15. This member 14 carries the inturned flange 16 which has cut therein the internal gear 17.

The outer side of the wheel carries the circular housing member 18 which serves to inclose the gear mechanism. Fitting immediately within this housing 18 is the drive member 19 which is secured direct to the wheel by the bolts 20. The drive member has formed thereon a plurality of lugs 25, the radially inward end of these lugs 25 carrying split bearings 24 of usual form. Rotating in the bearings 24 are the shafts 23, each shaft carrying keyed to its outer end a gear wheel 27 in mesh with the driving pinion 12 on the drive shaft and forming therewith an epicyclic train. The inner end of each shaft 23 carries fixed thereto a gear wheel 22 which is in mesh with the internal gear 17 and forms therewith a hypocyclic train. The gear assembly is closed by the cover 28 which is held in place by the bolts 29, the peripheral portion of the cover being in intimate contact with outer edges of the members 18 and 19, so as to form an oil tight closure.

In Fig. 3 I have shown a structure similar to that shown in Figs. 1 and 2 with the exception that three gears 22 and 27 are provided instead of the two shown in the first two figures. It is obvious that variation in the number of such gears does not change the operation of the device in any way, and that one or any greater number may be used.

In the operation of my gears the power is supplied through the shaft 11 which may be integral with the armature or the revolving field of a motor or simply a floating rear axle supplied with power in any customary manner. This shaft carries the gear 12 which meshes with the gears 27, causing them to rotate. These latter gears 27 are keyed to the shaft 23 of the gears 22 which latter gears consequently rotate with the gears 27. The gears 27 are in mesh with the internal gear 17 which is attached to the fixed axle housing 4 and consequently cannot rotate. Hence the gears 22 roll around inside the internal gear 17 and the shafts 23 being seated in the bearings 24 cause the wheel to rotate with these shafts, since the bearings 24 are carried by the drive member 19 which is rigidly attached to the wheel.

It is to be noted that there is a double gear reduction, first between the driven gear 12 and the gears 27 and second between the gears 22 and the internal gear 17. The gear ratio may be readily varied by substituting other gears of different sizes for the gears 12 and 27. This change may be readily accomplished, without dismantling the wheel structure, by simply removing the cover plate 28.

In the form of the device shown in Fig. 4, the driven train is an epicyclic train instead of the hypocyclic train shown in the other figures. Otherwise the structure is similar. Here the driven generating gear 22 rotates about the spur gear 43 which is fixed to the axle housing 4' of the vehicle. This form of the device preserves the feature of the double reduction in the gear although as a practical matter the second reduction can be made greater with a hypocyclic than with an epicyclic train.

It should be noted that in order to turn the wheel in the same direction it is necessary to reverse the movement of the driving axle if the driven gear is epicyclic rather than hypocyclic. This feature is important for when my gear is used with the type of electric vehicle using a motor which has armature and field both rotating but in opposite direction thus causing the opposite shafts to run in opposite directions, if one wheel is fitted with the form of the device shown in Figs. 1 to 3, the other may be fitted with that shown in Fig. 4, and both wheels will rotate in the same direction.

An important feature of my invention lies in the fact that the total gear reduction, which may be varied within wide limits, takes place at the point of drive to the wheel. This fact permits the use of a drive shaft or other driving member which rotates at a higher rate of speed and which consequently may be made much lighter than would be the case were the reduction made at the initial end of the line of power transmission or intermediate that line as is usually the case.

In the form shown in Fig. 1 a small clearance is shown between the shaft 11 and housing 4 and the outer end of the axle floats between the gears 27, while in Fig. 4 the outer end of the casing 4' forms a bearing for the shaft 11. Obviously either construction may be used with either form of gearing.

I claim:

1. In combination, a wheel, a fixed axle therefor, a driving shaft extending through the fixed axle, a driving gear fast to the driving shaft, a gear wheel in mesh with the driving gear, a shaft for the gear wheel, a generating gear of a hypocyclic train fixed to said shaft, the shaft being journaled in bearings fixed to the wheel, the base of the hypocyclic train being fixed to the axle, said gear assembly being housed in a casing on the outer side of the wheel, the casing having a cover removable without dismantling the gears and adapted to permit access thereto.

2. In combination, a wheel, a fixed axle therefor, a driving shaft extending through the fixed axle, a driving gear fast to the driving shaft, a gear wheel in mesh with the driving gear, a shaft for the gear wheel, the latter being located at one end thereof, a generating gear of a hypocyclic train fixed to the other end of said shaft, the intermediate portion of the shaft being journaled in bearings fixed to the wheel, the base of the hypocyclic train being fixed to the axle, said gear assembly being housed in a casing on the outer side of the wheel, the casing having a cover removable without dismantling the gears and adapted to permit access thereto.

Signed by me at Boston, Massachusetts, this thirteenth day of February, 1920.

DONALD W. PERIN.